United States Patent [19]
Montant et al.

[11] Patent Number: 6,034,526
[45] Date of Patent: Mar. 7, 2000

[54] APPARATUS FOR CONTROLLING THE INFLATION PRESSURE OF A MATTRESS IN RESPONSE TO DEFORMATION OF THE MATTRESS USING IMPEDANCE MEASUREMENT

[75] Inventors: Jean-Marc Montant, Montpellier; Jean-Luc Caminade, St. Jean-de-Vedas, both of France

[73] Assignee: Support Systems International Industries, Montpellier, France

[21] Appl. No.: 08/898,487

[22] Filed: Jul. 22, 1997

[30] Foreign Application Priority Data

Jul. 23, 1996 [FR] France ................................ 96 09205

[51] Int. Cl.[7] ............................ G01B 7/14; A47C 27/10; A61G 7/057
[52] U.S. Cl. .............................. 324/207.19; 324/207.16; 128/845; 5/453
[58] Field of Search ........... 324/207.19, 207.11–207.12, 324/207.15–207.17, 691, 725; 336/30; 128/845, 846, 870; 5/449, 453, 455, 456, 469

[56] References Cited

U.S. PATENT DOCUMENTS

| | | | |
|---|---|---|---|
| 4,160,204 | 7/1979 | Holmgren et al. | 324/287 |
| 4,797,962 | 1/1989 | Goode | 5/453 |
| 4,833,457 | 5/1989 | Graebe, Jr. | 340/626 |
| 4,949,412 | 8/1990 | Goode | 5/453 |
| 5,020,176 | 6/1991 | Dotson | 5/453 |
| 5,412,327 | 5/1995 | Meinen | 324/686 |
| 5,560,374 | 10/1996 | Viard | 128/845 |
| 5,850,644 | 12/1998 | Hsia | 5/422 |

FOREIGN PATENT DOCUMENTS

| | | |
|---|---|---|
| 0 218 301 | 4/1987 | European Pat. Off. . |
| 0 379 694 | 12/1989 | European Pat. Off. . |
| 0 676 158 A1 | 10/1995 | European Pat. Off. . |
| 25 50 427 A1 | 5/1976 | Germany . |
| 42 31 616 A1 | 3/1994 | Germany . |
| 9411493 U | 12/1994 | Germany . |

OTHER PUBLICATIONS

Journal de l'Equipement Electrique et Electronique, No. 306, Nov. 1970, pp. 116–117, XP002027296, *Conception et Develloppement De Capteurs De Proximite*.

*Primary Examiner*—Jay Patidar
*Attorney, Agent, or Firm*—Wolf, Greenfield & Sacks, P.C.

[57] ABSTRACT

A method and apparatus for supporting a patient on a mattress. The apparatus includes a mattress which has at least one controlled release chamber with a top face and a bottom face. A flexible film of a thin metal foil is linked to the top face, while at least one impedance varying device is linked to the bottom face of the chamber. The impedance varying device is an integral part of a measuring electronic bridge. Changes in the impedance as a result of movement of the top face with respect to the bottom face activates a servo control which increases or decreases the inflation pressure within the chamber to make certain that the distance between the top face and the bottom face of the chamber is maintained at a predetermined distance. The method of this invention includes the steps of providing a mattress having at least one closed or controlled release chamber having a top face and a bottom face, providing a measurement device which includes a flexible film of a thin metal foil linked to the top face of the chamber and cooperating with at least one impedance varying element linked to the bottom face of the chamber, the impedance varying element being integral with a measuring electronic bridge, and measuring spacing between the top face and the bottom face to provide control of the supporting action of the mattress as a function of the patient's morphology and position on the mattress.

20 Claims, 8 Drawing Sheets

APPARATUS FOR CONTROLLING THE INFLATION PRESSURE OF A MATTRESS IN RESPONSE TO DEFORMATION OF THE MATTRESS USING IMPEDANCE MEASUREMENT

The invention essentially relates to a method and a device integrating an induction coil in a measurement electronic bridge.

BACKGROUND OF THE INVENTION

It is known by the Article published in "Journal de l'Equipement Electrique et Electronique" No. 306, November 1970, pages 116–117, equipments which are temperature compensated for sensing movements of moving surfaces like axles.

It is disclosed a method of compensating a thermal derivation by using two transducers located in two branches of an electronic bridge, see FIG. 1, and sufficiently close so that they are supposed to be at the same temperature.

One of the transducers named as reference, see FIG. 2, is located in front of a gap which is known and fixed.

FIG. 3 shows a total thermal compensating bridge with inductive coils.

In that document, the two transducers are fixed and are separated by a known fixed distance.

It is also known by German Patent Application DE-A-2550427, corresponding to U.S. Pat. No. 4,160,204, a non-contact distance measuring system comprising an electronic bridge particularly seen in FIGS. 1 and 3, having branches wherein branch 20 is a distance related impedance and the other branches 14, 16, 18 have a fixed impedance, branch 18 serving as a reference impedance for comparing signal changes across branch 20 caused by the impedance change of transducer 22, see column 2, lines 29–48.

The present invention differs from that document by the use of a flexible film of a thin metallic foil which is essentially movable and deformable in space and is a part of a support element for supporting an element to be supported in relation with the volume and shape thereof, in particular a patient P in relation with his or her morphology, and it was unobvious for one skilled in the art that the principle of the non-contact distance measuring system as disclosed in that document could be used in such a technical field, in particular a medical field and applied to the measurement of the positioning of an element acting on an essentially flexible and deformable in space supporting device, i.e. wherever controlled deformability is a requirement.

Other distance sensors using a bridge circuit incorporating variable capacities are also disclosed in U.S. Pat. No. 5,412,327 and its counterpart DE-4,231,816.

Document EP-A-0 218 301 discloses a method and a device for improving support of a patient, which support comprises a mattress provided with one or more closed chambers filled with a fluid under a controlled filling pressure, and uses a measurement device based on a combination of two induction coils 24, 25 shown in particular in FIG. 4 of that document. That device is not very satisfactory because it requires provision to be made to power both induction coils, i.e. including the moving induction coil which is disposed close to the patient, and that always poses a safety problem.

In Document FR-A-2 718 347=EP-A-676 158, the applicant discloses a method and apparatus for supporting an element to be supported, in particular the body of a patient, making it possible to support the element at an essentially constant controlled penetration depth by means of a measurement device comprising an induction coil combined with a piece of metal foil situated under the body being supported, the metal foil being displaced by penetration of the body being supported. Displacement modifies the self-induction coefficient of the induction coil, shifting the resonant frequency of the LC circuit away from the tuning frequency of the oscillator, thereby damping the signal delivered to an amplifier by the oscillator.

The applicant's prior device therefore suffers from the drawback that operation thereof is based on a non-desirable frequency variation. Furthermore, the voltage value obtained is low. In addition, the frequency variation is difficult to make compatible with electromagnetic safety standards. Finally, the frequency variation measurement is sensitive to surrounding metal masses.

OBJECTS AND BRIEF SUMMARY OF THE INVENTION

Therefore, a main object of the present invention is to provide a solution to solve the new technical problem of measuring the positioning of an element to be supported in relation with the volume and shape thereof, in particular with the morphology of a patient.

A further main object of the present invention is to provide a solution that makes it possible to keep frequency substantially constant in an inductive system for measuring the positioning of an element whose shape frequently varies, thereby improving electromagnetic compatibility.

Another main object of the present invention is to provide a solution that makes it possible to obtain a large voltage variation as a function of the movement and deformation of one measuring element resulting itself from the movement and deformation of a deformable support device caused by the action of an element to be supported, in particular a patient, with the purpose of controlled deformation of said support device supporting said element, said measuring element being a part of an inductive system, for example including an induction coil.

Another main object of the present invention is to provide a solution that makes it possible to shield an inductive system for measuring the positioning of a deformable support device cause by the action of an element to be supported, like a patient, thereby having shape of said support device frequently varying, said inductive system e.g. including an induction coil, so that the system is shielded from surrounding metal portions.

The above-mentioned objects are achieved simultaneously for the first time by the present invention in a way that is simple, that is cheap, and that can be used on an industrial and medical scale.

In a first aspect, the present invention provides a method of measuring the positioning of an element supported by a deformable support device and the correlated deformation of said support device resulting from the action of said element acting on said support device, which device comprises an impedance-varying element for measuring the positioning of said element characterized in that it comprises in integrating said impedance-varying element in a measurement electronic bridge.

In another particular embodiment, the measurement device comprises a flexible film of a thin metal foil movable and deformable in space subjected to a displacement and deformation to be measured, in relation with movement and deformation of the support device caused by said element.

Thus, in a particular variant embodiment, the thin metal foil cooperates with a deformable support device for supporting an element to be supported, in particular a patient, which support device is moved and deformed when supporting said element in particular a patient. When the element to be supported is a patient, the support element is generally a mattress. Advantageously, the support element generally comprises at least one closed chamber inflated or deflated by feeding in or releasing a fluid, e.g. air.

In an advantageous embodiment, the impedance-varying element is chosen from the group consisting of: a resistive element, e.g. a conductive foam; a capacitive element, e.g. in which a flexible film of a thin metal foil movable and deformable in space is one of the components of the capacitor; an inductive element; and an element made up of any combination of the three above-mentioned basic elements. In the context of the invention, an inductive element is preferably used at present.

In a currently preferred embodiment, the measurement inductive element is an induction coil.

In an advantageous embodiment, that branch of the measurement bridge which is opposite from the measurement element (advantageously an induction coil) includes a shielding induction coil.

In a particular variant, the shielding induction coil is arranged at a predetermined distance from the measurement element, and in particular the measurement induction coil, so as to prevent any influence from a metal mass situated under the measurement device or in the vicinity thereof.

In a second aspect, the present invention provides an apparatus for improving the operation of a measuring device for measuring the positioning of an element supported by a deformable support device and a correlated deformation of said support device resulting from the action of said element acting on said support device, which device comprises an impedance-varying element for measuring the positioning of said element, said apparatus being characterized in that it comprises a measurement electronic bridge integrating said impedance-varying element.

In another particular variant embodiment, the measurement device comprises a flexible film of a thin metal foil movable and deformable in space subjected to a displacement and deformation to be measured resulting from the action of said element acting on said deformable support device during support thereof.

In an advantageous embodiment of the invention, the impedance-varying element is chosen from the group consisting of: a resistive element, e.g. a conductive foam; a capacitive element, e.g. in which a flexible film of a thin metal foil movable and deformable in space is one of the components of the capacitor; an inductive element; and an element made up of any combination of the three above-mentioned basic elements.

In the context of the invention, an inductive element is currently preferably used.

In a currently preferred embodiment, the measurement inductive element comprises a "measurement" induction coil.

In an advantageous embodiment of the invention, that branch of the measurement bridge which is opposite from the measurement element includes a shielding induction coil.

In an advantageous variant embodiment, the shielding induction coil is disposed at a predetermined distance from the measurement element, so as to prevent any influence from a metal mass situated under the measurement device or in the vicinity thereof.

In another advantageous variant embodiment, the shielding induction coil and the measurement induction coil are identical, thereby making it possible for the shielding induction coil and the measurement induction coil to vary identically when they are subject to outside influences, e.g. caused by metal elements such as the bed.

In yet another advantageous variant embodiment, the two other branches of the measurement bridge preferably have identical impedance.

To make the opposite branches of the measurement bridge as identical as possible, the shielding induction coil may advantageously be combined with a second film of metal foil identical to the moving flexible film of thin metal foil, which second flexible film of metal foil is disposed at a predetermined distance from the shielding induction coil. By way of simplification, and to take up as little space as possible, the second flexible film of metal foil may be glued against the shielding induction coil outside the measurement bridge, i.e. opposite from the measurement device.

Advantageously, the bridge is set to a zero value for a predetermined distance value, e.g. in the vicinity of zero, i.e. when the moving film of metal foil is almost touching the measurement inductive element, e.g. an induction coil.

In a currently preferred embodiment, the deformable support element is a mattress that is advantageously an anti-bedsore mattress.

In a third aspect, the invention provides an apparatus for supporting an element to be supported, in particular a patient, comprising a measuring device for measuring the positioning of an element supported by a deformable support device and a correlated deformation of said deformable support device resulting from the action of said element acting on said support device in relation with the volume and shape of said supported element, comprising an impedance-varying element for measuring said positioning, wherein the improvement comprises the integration of said measurement impedance-varying element in a measurement electronic bridge, thereby improving the measurement of the penetration distance to which said element, in particular a patient, being supported penetrates into the deformable support device.

According to an advantageous embodiment, said measuring device comprises a flexible film of a thin metallic foil movable and deformable in space subjected to a displacement and deformation to be measured, in relation with movement and deformation of the deformable support device caused by said supported element.

Other features of the invention also appear in the claims which are incorporated herein in their entirety by reference.

In a fourth aspect, the present invention further provides a method of treating bedsore or lowering the risk of occuring of bedsore of a patient lying on a mattress, comprising:

a) providing a mattress comprising at least one closed or controlled released chamber flexible and inflatable at an adjustable predetermined initial inflation pressure, said chamber having a top face serving to support said patient and a bottom face which may rest on a base or an equivalent means;

b) providing a measurement device comprising a flexible film of a thin metal foil linked to the top face of said chamber and cooperating with at least one impedance varying element linked to the bottom face of said chamber, said impedance varying element being an integral part of a measuring electronic bridge;

c) measuring the positioning and deformation in space of said flexible film of said thin metallic foil with said impedance varying element and acting on the inflation pressure of said chamber, in function of said measuring, thereby providing control, preferable automatic control, of the supporting action of said mattress as a function of the patient's morphology and positioning into said mattress.

For a person skilled in the art, the characteristics of the method result clearly from the preceding description and from the following description, taken as a whole, and including the claims which are included herein by reference in their entirety.

BRIEF DESCRIPTION OF THE DRAWINGS

Other objects, characteristics and advantages of the invention will appear clearly to a person skilled in the art on reading the following description made with reference to a plurality of currently-preferred embodiments of the invention given by way of illustration and therefore in no way limiting the scope of the invention. In the accompanying drawings.

MORE DETAILED DESCRIPTION

Figure 1:
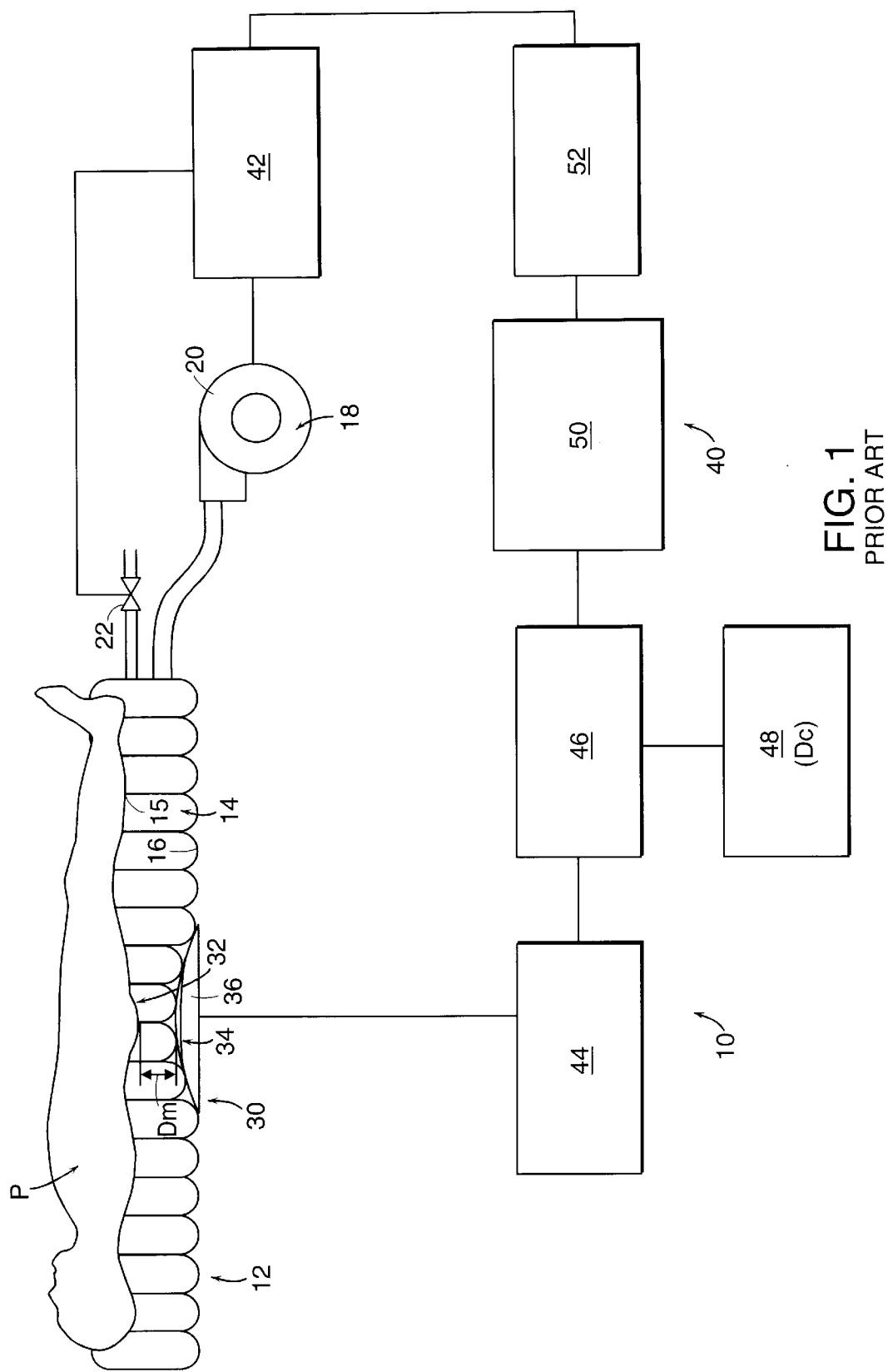
FIG. 1 is a diagrammatic view of an embodiment of support apparatus as described with reference to FIG. 2 of the applicant's prior document: FR-A-2 718 347=EP-A-676 158.

FIG. 1 shows the prior art support apparatus as described in Document FR-A-2 718 347=EP-A-676 158 given the overall reference 10. That support apparatus makes it possible to support an element, in particular the body of a patient P, as shown.

The apparatus 10 includes a deformable support device proper 12, e.g. a mattress, comprising at least one closed or controlled-release chamber 14 that is flexible and inflatable. For example, the chamber may be composed of a multitude of inflatable tubes that communicate with one another, said chamber 14 being inflatable under an adjustable predetermined initial inflation pressure. The chamber 14 has a top face 15 serving to support the element to be supported, preferably patient P, and a bottom face 16 which may, for example, rest on a base (not shown) or on equivalent means. The apparatus further includes servo-control means 18 for servo-controlling the pressure at which the chamber 14 is filled as a function of the distance to which the element being supported penetrates into the support device. For example, said servo-control means may comprise filling means 20, such as pumping means 20 for pumping a filling fluid into the chamber 14, such as a gas, in particular air, or a liquid, in particular water, and it may include emptying means such as a valve 22.

The apparatus also includes measurement means 30 for measuring the positioning D resulting from deformation of the top face 15 of the chamber versus its bottom face 16.

The measurement means 30 include a metal element 32, advantageously in the form of a flexible film of a thin metallic foil, movable and deformable in space by being linked to the top face 15 of the chamber 14, inside said chamber 14 in this example, said movement and deformation being caused by penetration of the volume and shape of said supported element, preferably a patient, in said deformable support device, preferably a mattress, said metallic foil cooperating with at least one inductive element 34 forming a position detector linked to the bottom face 16 of said chamber 14, which inductive element may be disposed inside the chamber 14, integrated into the bottom face of the chamber 16, or else it may secured to the outside of said bottom face 16 of the chamber 14, as shown.

The apparatus also includes control means 40 that act on the servo-control means 18 for servo-controlling he inflation pressure of the chamber 14 to ensure that, while the element is being supported, the positioning D of the top face 15 versus the bottom face 16 of the chamber 14 is kept preferably at a predetermined position value, e.g. an essentially constant value, i.e. a value essentially equal to a reference position $D_c$, or within an acceptable range of variation there about.

The control means 40 may advantageously include a control station 42 comprising an electronic or an electromechanical central processing unit having a memory, which unit continuously or intermittently receives signals that are proportional to the value of the measured position $D_m$, and that are transmitted by the above-mentioned measurement means 30, and compares the measured values $D_m$ with the reference position value $D_c$. The control station 42 controls the servo-control means 20, 22 for servo-controlling the inflation pressure of the chamber 14 so that a measured position $D_m$ is obtained that is essentially constantly equal to the reference position $D_c$ or within an acceptable range of variation there about.

Figure 3:
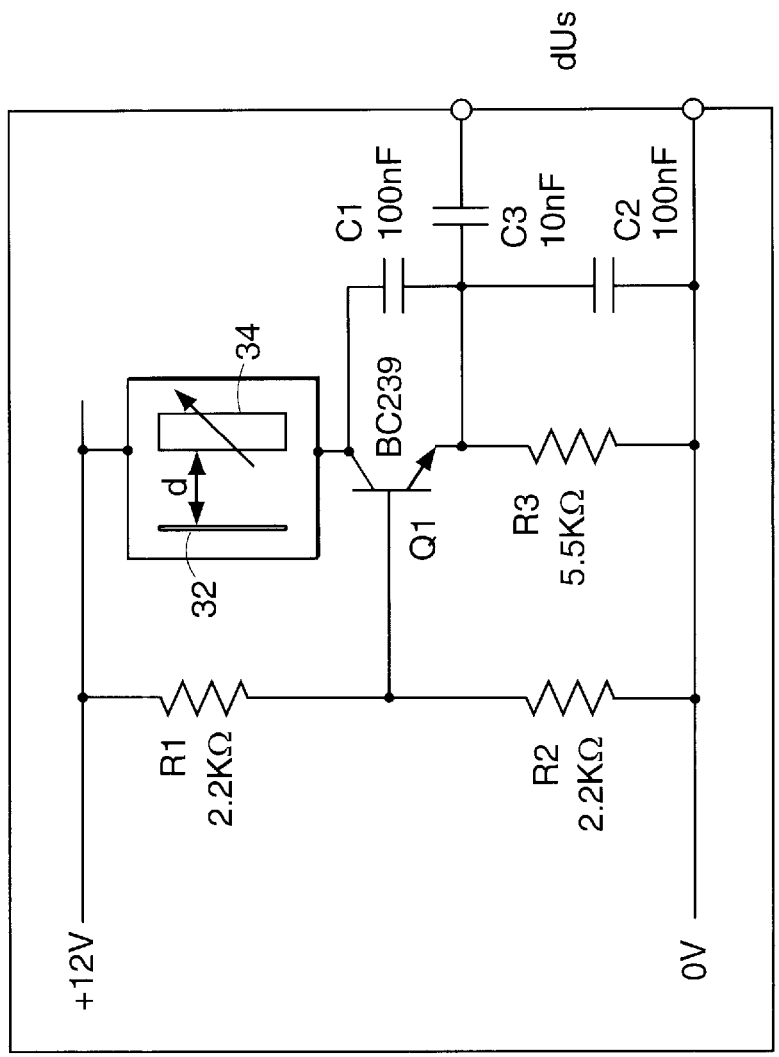
FIG. 3 is a diagrammatic view of a portion of the electronic circuit of the oscillator, showing the device for measuring the positioning of an element to be supported, preferably a patient, which device comprises a combination of a flexible film of a thin metal foil which is movable and deformable in space, and an induction coil, the metal foil being disposed on a deformable support device, such as a mattress, so as to be moved and deformed while the element being supported is penetrating into the deformable support device, in conformity with the technical solution described in the applicant's prior document: FR-A-2 718 347=EP-A-676 158.

The control means 40 may include an oscillator device 44 shown in detail in FIG. 3 and coupled to the inductive element 34, such as an induction coil, an amplifier device 46 whose gain may be adjusted by a reference setting device 48 defining the reference position $D_c$. The amplifier 46 is then coupled to a proportional-plus-integral regulator device 50 coupled to a matching device 52 whose output is coupled to the control station 42.

The control means 40 are described in detail in the applicant's previous document FR-A-2 718 347=EP-A-676 158 in its description relating to FIGS. 1 to 4 and FIG. 6 thereof.

In the embodiment shown in FIG. 1, the inductive element 34, such as an induction coil, is, for example, arranged on a reinforcing member 36 positioned in the vicinity of that region of the element being supported P which has the largest mass or which is most protuberant, namely the sacral region of the patient P in this example, as explained in the applicant's above-mentioned prior document, therefore the thin flexible metal foil 32 is also facing the sacral region of the patient P. The thickness of this foil is for example ranging between about 10 $\mu$m and 40 $\mu$m.

Figure 2:
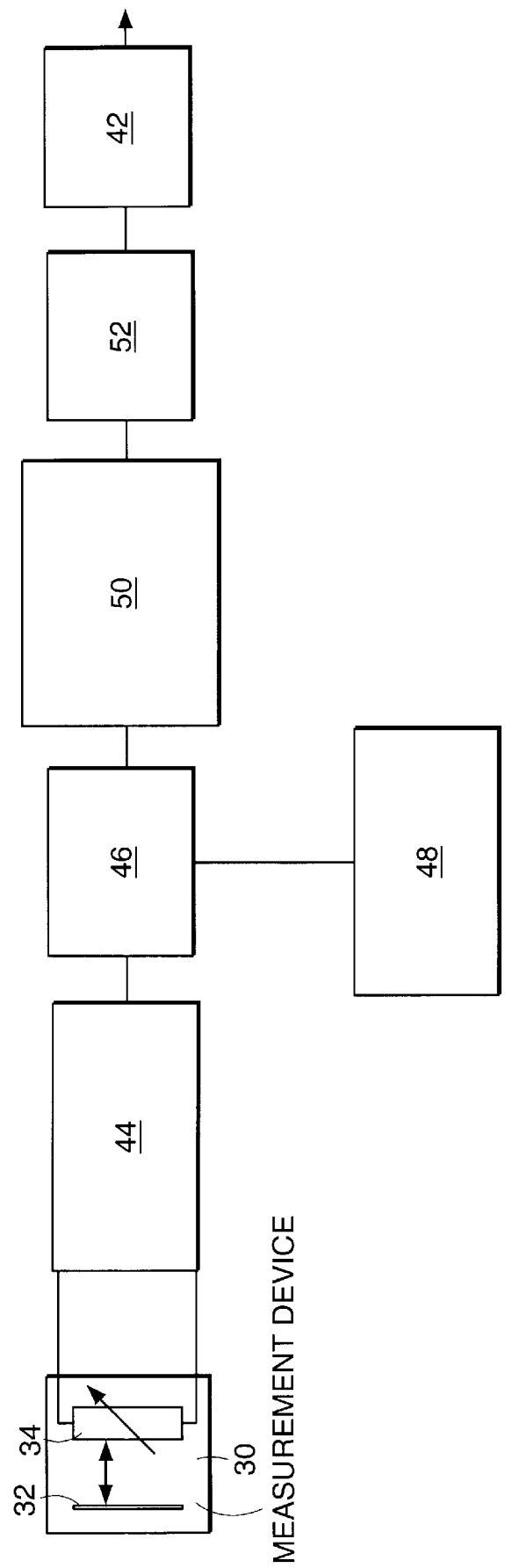
FIG. 2 is a slightly modified version of FIG. 6 of the same prior document FR-A-2 718 347=EP-A-676 158.
Figure 4:
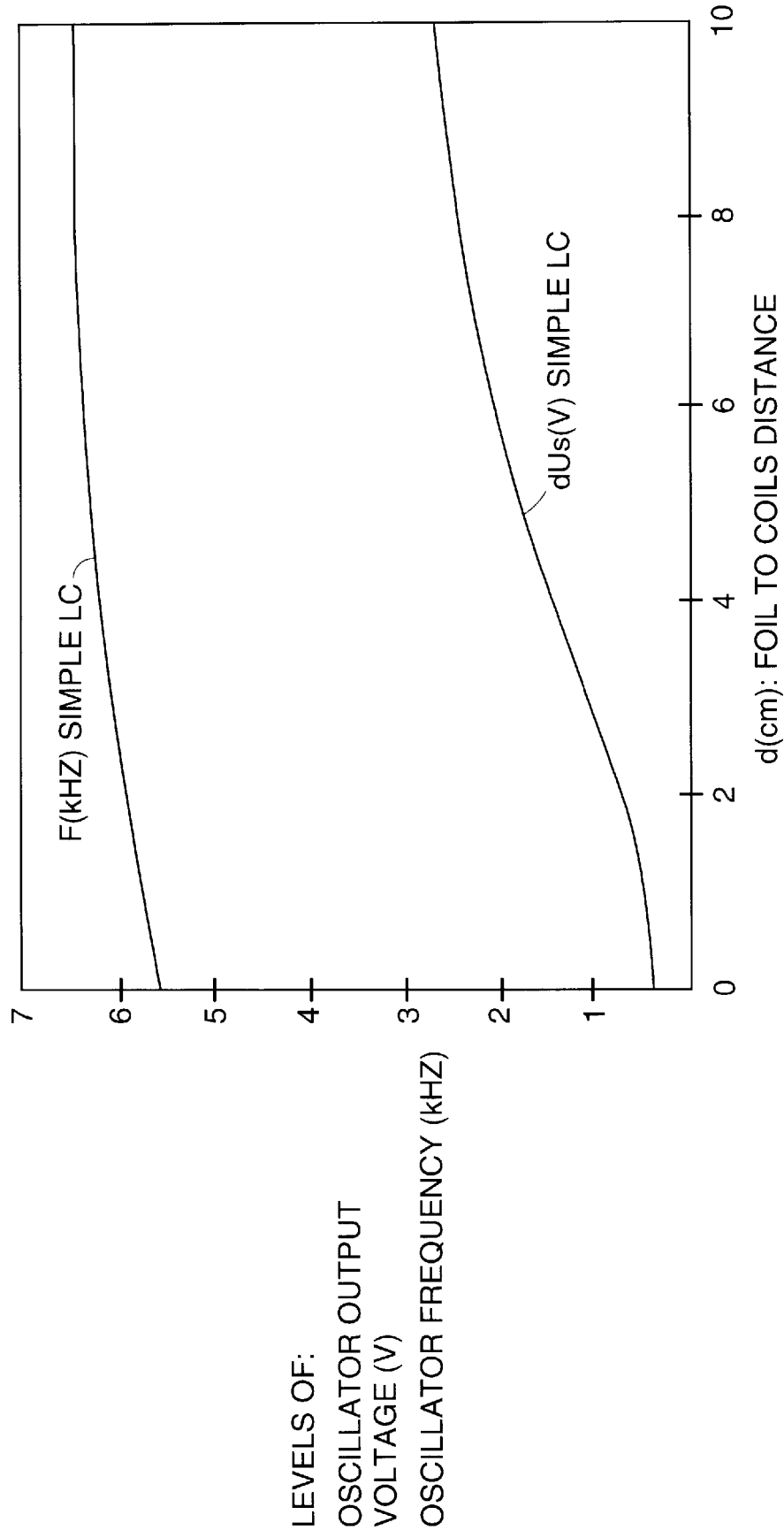
FIG. 4 shows the frequency and voltage curves obtained as a function of the movement and deformation of the metal foil in the applicant's prior device shown in accompanying FIG. 3; distance is plotted at the closest point of the deformed foil along the x-axis in centimeters, and either frequency in kHz or voltage in volts is plotted up the y-axis.
Figure 5:
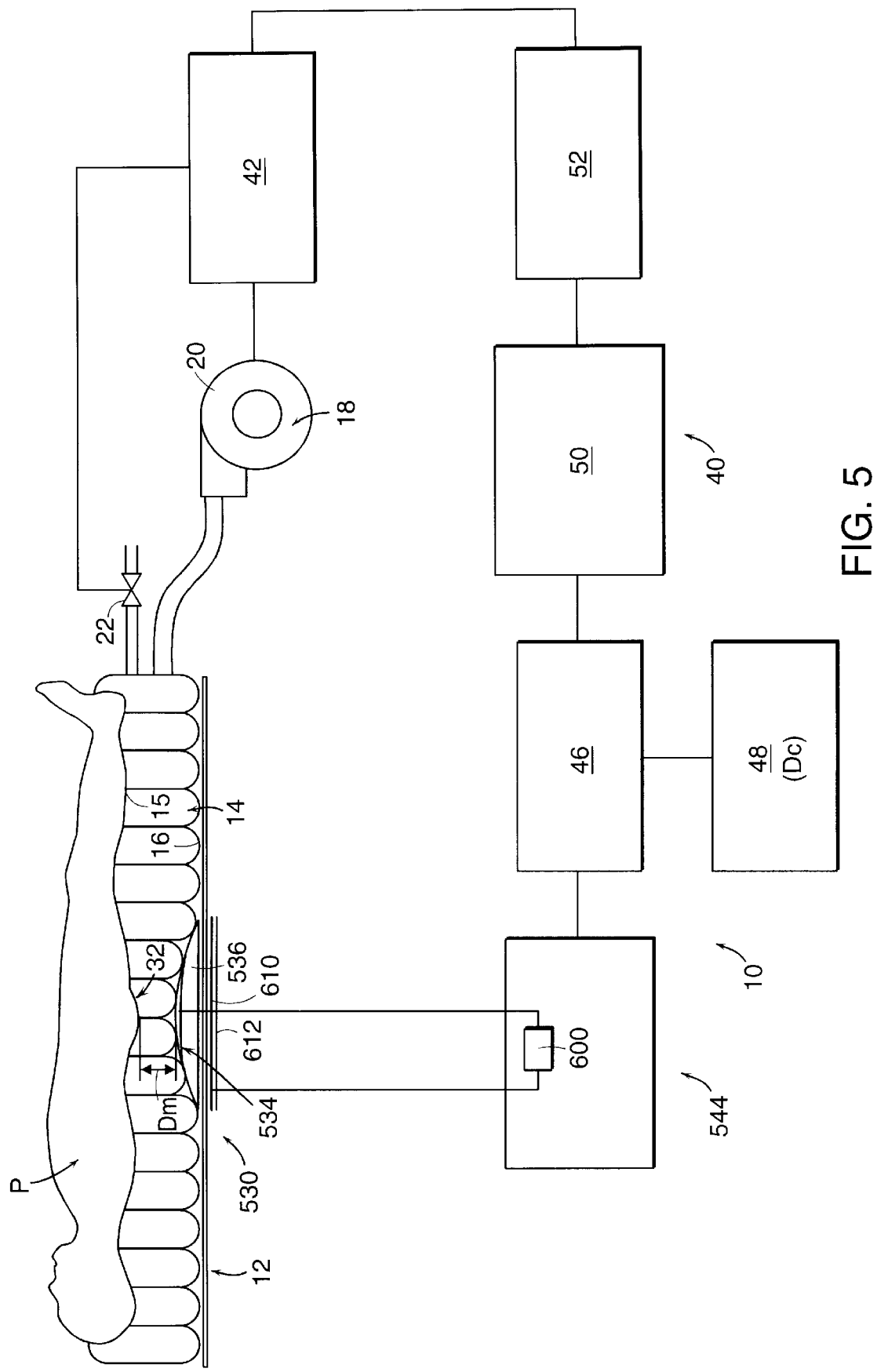
FIG. 5 is a diagrammatic view of a first embodiment of support apparatus of the present invention including a deformable support device having a single chamber.

Accompanying FIG. 4 shows the curves giving frequency and voltage as a function of the distance between the flexible thin metal foil 32 and the inductive element or coil 34 that are obtained with the applicant's prior apparatus, as shown in accompanying FIGS. 1 to 3. It can be observed that the value of the frequency varies as a function of distance over the range 5.5 kHz to 6.5 kHz approximately. This frequency variation is considerable because it is about 20% of the initial frequency, and it constitutes an interference phenomenon relative to the voltage value, it being desirable for the voltage value to be substantially proportional to distance. Furthermore, frequency variation might give rise to electromagnetic compatibility problems. Finally, with that prior solution, and as shown in FIG. 4, the variation of the voltage as a function of distance is relatively small since the voltage varies from 0.5 V initially to about 2.5 V for a distance variation of 10 cm, which gives rise to difficulties in processing the signal.

In the context of the present invention, as shown in FIGS. 5, 6, 7, and 8, the apparatus is modified so that the measurement device includes an impedance-varying element for measuring the position of the closest point of the supported element, namely in practice of the deformed foil 32, said impedance varying element being integrated in an electronic measurement bridge. By way of simplification, and to facilitate understanding, the elements identical to those of the assignee's prior document are shown with the same reference numbers, while the elements that are modified are given the same references plus 500. In the context of the present invention, the prior oscillator 44 is modified and is given the reference number 544, and its outline is shown in dashed lines in FIG. 6. The prior measurement device 30 is referenced 530 because it is an integral part of a measurement bridge 600 which is described in more detail below. The flexible thin metal foil element, which remains unchanged, is still referenced 32, and the prior inductive element at 34 is constituted more generally by an impedance-varying element referenced 534 which is integrated into the measurement bridge 600. The impedance-varying element may be chosen from the group consisting of: a resistive element, e.g. a conductive foam; a capacitive element, e.g. in which a flexible film of a thin metal foil which may be constituted by the flexible film of metal foil 32 is one of the components of the capacitor; an inductive element, in particular a measurement induction coil, as shown because it constitutes the currently preferred embodiment; and an element made up of any combination of the three above-mentioned basic elements.

The vertices of the branches of the measurement bridge are respectively referenced 1, 2, 3, and 4. For example, the measurement element 534 may be connected to the vertices 1 and 2. The vertex 1 is connected to the vertex 4 via a branch including a first impedance Z1, the vertex 4 is connected to the vertex 3 via a branch which is situated opposite from the branch including the measurement element 534. In this example, this opposite branch preferably includes a shielding induction coil 610 whose function is explained below. The vertex 3 is connected to the vertex 2 via a branch including a second impedance Z2 in this example. The vertices 1 and 3 of the measurement bridge are also connected to the amplifier 46, optionally via at least one decoupling capacitor C2.

It should be noted that, in practice, the oscillator 544 is made up of a static portion constituted by the measurement bridge 600, the capacitors C16 and C17, and a dynamic portion constituted by the transistor Q2 and its bias elements, as can be well understood by a person skilled in the art. The dynamic portion is connected to the vertices 4 and 2 of the measurement bridge 600.

Figure 6:
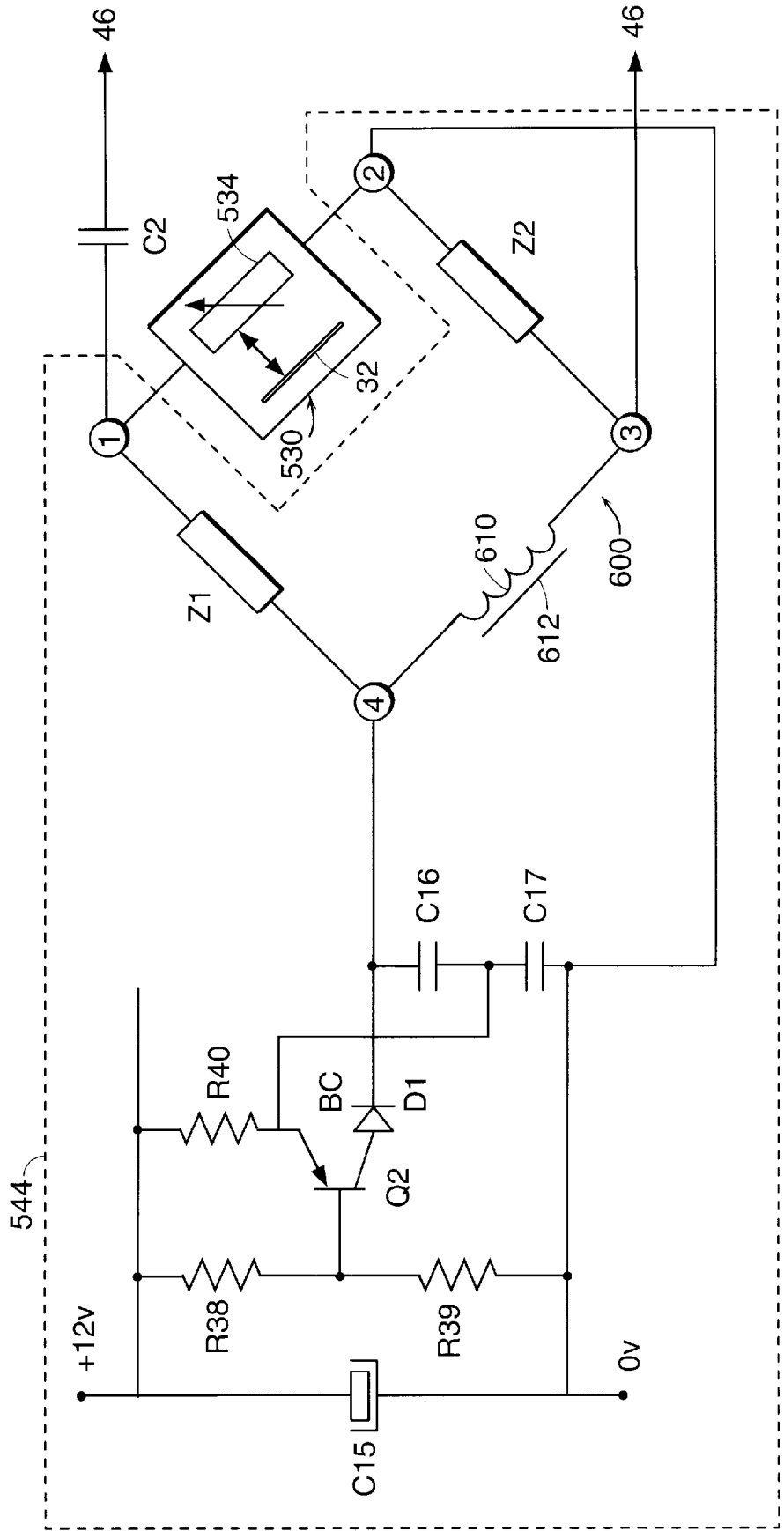
FIG. 6 shows the oscillator electronic circuit portion of the invention, integrating the movement and deformation measurement device of the type described with reference to FIG. 3 in a measurement electronic bridge according to the present invention.

According to the present invention, when the impedance-varying element is an inductive element in particular constituted by a measurement induction coil, as shown in FIG. 6, the shielding induction coil 610 is advantageously identical to the measurement induction coil 534 so that, when they are subjected to outside influences, e.g. caused by metal elements such as the bed, the shielding induction coil 610 and the measurement induction coil 534 vary identically. Similarly, the two other branches preferably have identical impedances Z1, Z2. To render the opposite branches of the measurement bridge 600 as identical as possible, it is preferable to combine the shielding induction coil 610 with a second piece of metal foil 612 identical to the moving flexible film of thin metal foil 32, the second piece of metal foil 612 being arranged at a predetermined distance from the shielding induction coil 610. By way of simplification and so as to take up as little space as possible, it can be glued against the shielding induction coil 610 outside the measurement bridge, i.e. opposite from the measurement device 530.

By means of this design of the measurement bridge, it is possible to set the bridge 600 to a zero value for a predetermined distance value, e.g. in the vicinity of zero, i.e. when the moving flexible film of thin metal foil 32 almost touches the induction coil 534.

Figure 7:
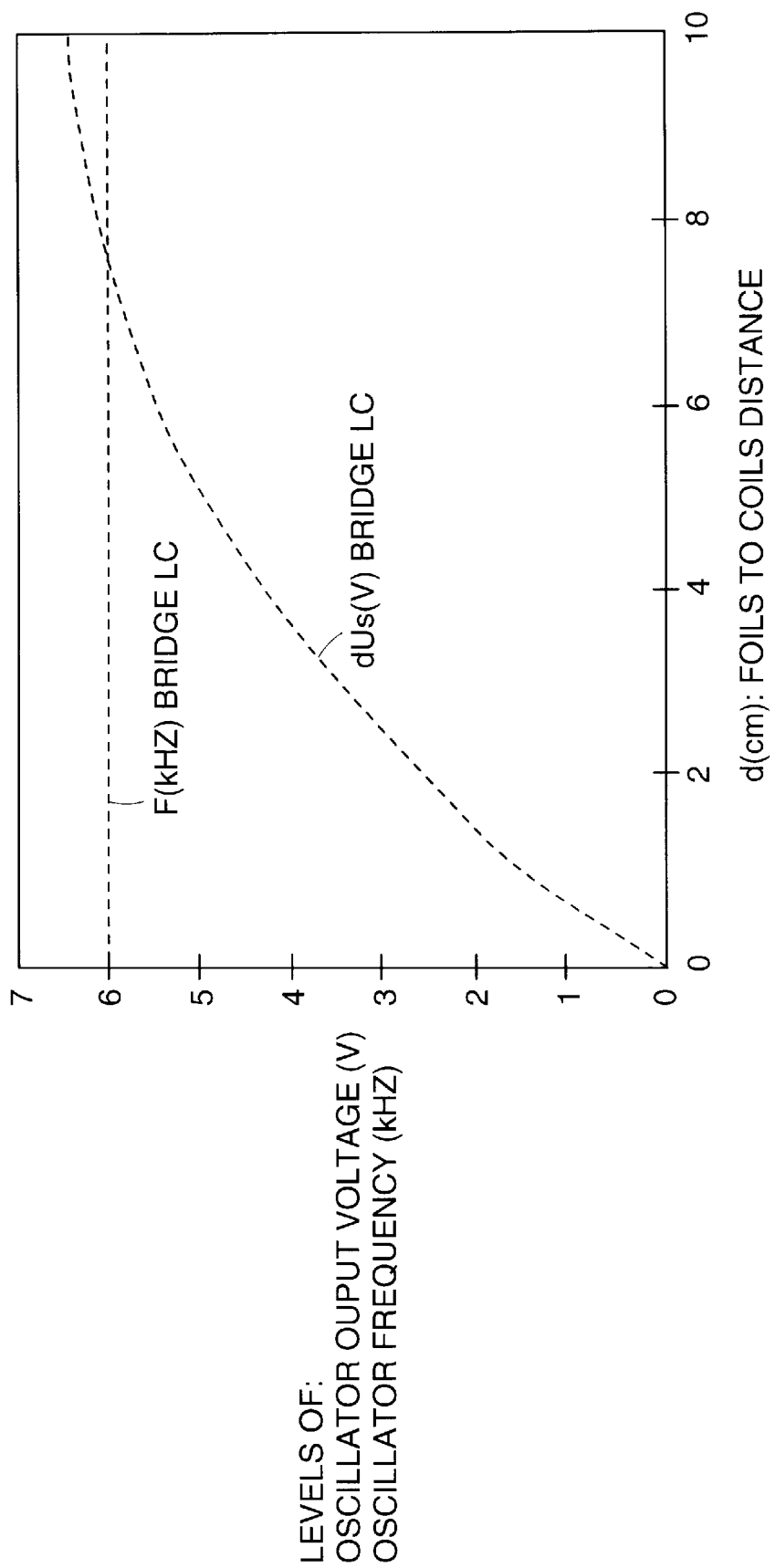
FIG. 7 shows the frequency and voltage curves obtained using the electronic bridge of the present invention, plotted using the same indications as those given for FIG. 4.
Figure 8:
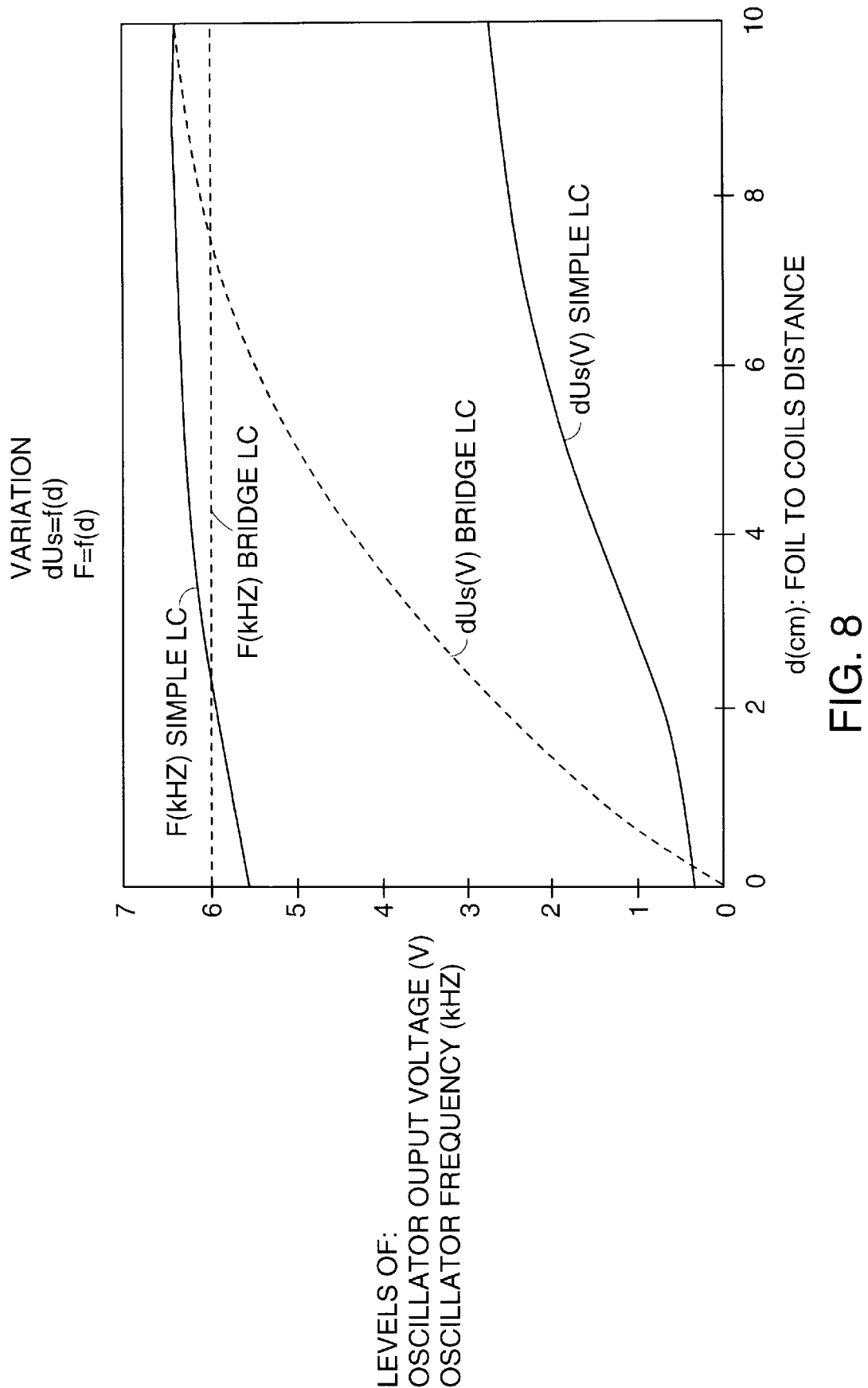
FIG. 8 shows the same frequency and voltage curves obtained firstly using the invention as shown in FIG. 7 and in dashed lines, and secondly using the assignee's prior art as shown in FIG. 4 and in solid lines, for the purposes of providing a better comparison.

FIGS. 7 and 8 show in dashed lines the curves giving frequency and voltage as a function of the distance between the closest point of the deformed metal foil 32 and the measurement induction coil 534 obtained with the design of the invention. It can be observed that the frequency is essentially constant so that the oscillator 544 has become an oscillator whose frequency is fixed under the operation conditions provided, in this example at about 6 kHz.

In contrast, the voltage curve varies considerably as a function of position, from a zero value for a distance initially set at zero to a voltage of about 6.5 volts for a distance of 10 cm, which represents a difference of 6.5 volts compared with about 2.5 volts in the prior solution shown in solid lines in FIG. 4 and reproduced in FIG. 8.

By means of the invention, greater reliability is obtained in processing the voltage as a function of the position, with a fixed frequency procuring the above-described advantages. Furthermore, it can be observed that the voltage curve is substantially proportional over a major portion of the distance, which portion is the portion in which the regulation must take place, unlike the curve obtained with the prior solution shown in FIGS. 4 and 8 in which the variation is less progressive.

It has to be noted that in the invention the supporting of a body having a large volume as it is the case for the body of a patient, introduces a notion of volume, therefore of distribution of the weight onto a contacting surface and of morphology which can not be shown by the mere measure of a distance as it was previously made in prior art devices.

In the invention, the fact that the metal foil is flexible and deformable in space is an important and critical feature since the deformation of the foil will correspond to the shape of the body and implies that the system provides a response which corresponds to the positioning of the body in the support as "seen" by the sensor in function of the morphology of the body and not only in function of a displacement closer or farther from the impedance-varying element like 534.

Naturally, the invention covers any means constituting techniques that are equivalent to the means described and shown. Furthermore, FIGS. 5, 6, and 7 form an integral part of the present invention and therefore of the description. Likewise, any characteristic which results from the description and from the drawings, and which appears to be novel compared with any state of the art is part of the present invention in its function or general means.

What is claimed is:

1. Apparatus for supporting a patient comprising:
   a mattress having at least one flexible, inflatable, closed or controlled release chamber, said chamber having a top face for supporting the patient and a bottom face structured to rest on a base;
   a flexible film of thin metallic foil linked to the top face of said chamber;
   an impedance varying element linked to said bottom face of said chamber and cooperating with said flexible film of thin metallic foil for measuring a position of said top face with respect to said bottom face;
   a measuring electronic bridge, said impedance varying element being an integral part of said measuring electronic bridge; and
   apparatus for controlling an inflation pressure of said chamber as a function of said position of said top face with respect to said bottom face.

2. The apparatus of claim 1, wherein said flexible film of thin metallic foil cooperates with said chamber for supporting the patient.

3. The apparatus of claim 2, wherein said chamber is inflated or deflated by feeding in or releasing a fluid.

4. The apparatus of claim 3, wherein said mattress is an anti-bedsore mattress.

5. The apparatus of claim 1, wherein said measuring electronic bridge has a branch which comprises a shielding induction coil.

6. The apparatus of claim 5, wherein the shielding induction coil is spaced from a measurement element in said bridge, thereby preventing any influence from a metal mass on the measurement element.

7. The apparatus of claim 1, wherein said impedance-varying element is selected from the group consisting of: a resistive element comprising a conductive foam; a capacitive element, in which said flexible film of thin metal foil is one of the components of the capacitor; an inductive element and any combination thereof.

8. The apparatus of claim 1, wherein said impedance-varying element is a measuring induction coil.

9. The apparatus of claim 1, wherein said measuring electronic bridge comprises four branches, one branch comprising as an impedance-varying element a measurement induction coil, a branch opposite to said measurement induction coil comprising a shielding induction coil, said coils being substantially identical.

10. The apparatus of claim 9, wherein the two remaining branches of said measuring electronic bridge comprise substantially identical impedances.

11. The apparatus of claim 9, wherein said shielding induction coil is combined with a second film of metallic foil identical to the thin metallic foil, said second metallic foil being disposed at a predetermined distance from the shielding induction coil.

12. The apparatus according to claim 11, wherein said second metallic foil is linked to the shielding induction coil outside the measuring bridge, opposite from the measurement device.

13. The apparatus of claim 1, wherein the measuring bridge is set to a zero value for a predetermined distance between said thin metallic foil and said impedance varying element.

14. The apparatus of claim 13, wherein the bridge is set to a zero value when the flexible film of thin metallic foil almost touches the impedance varying element at at least one point.

15. The apparatus of claim 1, wherein the at least one chamber is inflated or deflated by feeding in or releasing a fluid, and wherein said apparatus further comprises control means acting on a servo control means for servo controlling an inflation pressure of said chamber to maintain, while the patient is being supported, at a predetermined distance between a top face and a bottom face of the chamber.

16. The apparatus of claim 15, wherein said predetermined distance is an essentially constant value substantially equal to a reference distance or an acceptable range of variation thereof.

17. The apparatus of claim 15, wherein said control means comprise a control station comprising an electronic or electromechanical central processing unit having a memory, the unit continuously or intermittently receiving signals that are proportional to the value of a measured position of a closest point of the foil with respect to said impedance varying element which is correlated to a closest position of the patient, the value of the measured position being transmitted and compared with a reference distance value, said control station further controlling servo control means for servo controlling the inflation pressure of the chamber for maintaining the measured position essentially constantly equal to the predetermined distance.

18. A method of treating bedsores or preventing or lowering the risk of bedsores of a patient lying on a mattress, said method comprising:
   a) providing a mattress comprising at least one closed or controlled release chamber, said chamber being flexible and inflatable at an adjustable predetermined initial inflation pressure, said chamber having a top face for supporting said patient and a bottom face which may rest on a base;
   b) providing a measurement device comprising a flexible film of a thin metal foil linked to the top face of said chamber and cooperating with at least one impedance varying element linked to the bottom face of said chamber, said impedance varying element being an integral part of a measuring electronic bridge;

c) measuring a position and deformation in space of said flexible film of said thin metal foil with respect to said impedance varying element; and d) adjusting an inflation pressure of said chamber as a function of said measuring step, thereby providing control of the supporting action of said mattress as a function of the patient's morphology and positioning with respect to said mattress.

19. The method of claim 18, further comprising providing control means and servo control means, said control means acting on said servo control means for servo controlling the inflation pressure of said chamber to ensure that, while the patient is supported on said mattress, a distance between a position of a closest point of said foil linked to the top face and the bottom face of the chamber is maintained at a predetermined distance value substantially equal to about a reference distance.

20. The method of claim 19, wherein said control means further comprise a control station comprising an electronic or an electromechanical central processing unit having a memory, the unit continuously or intermittently receiving signals that are proportional to a value of a measured distance, transmitted by said measurement device and comparing the measured distance with the reference distance.

* * * * *